United States Patent
Dempsey et al.

(10) Patent No.: US 7,905,498 B2
(45) Date of Patent: Mar. 15, 2011

(54) GASKET FORMED FROM VARIOUS MATERIAL

(75) Inventors: Dennis Dempsey, Willow Street, PA (US); Jeffery Barrall, Lititz, PA (US); EvAnn Rempala, Landisville, PA (US); Jinfeng Zhuang, Lititz, PA (US)

(73) Assignee: Interface Solutions, Inc., Lancaster, PA (US)

( * ) Notice: Subject to any disclaimer, the term of this patent is extended or adjusted under 35 U.S.C. 154(b) by 862 days.

(21) Appl. No.: 11/692,573

(22) Filed: Mar. 28, 2007

(65) Prior Publication Data

US 2007/0228668 A1    Oct. 4, 2007

Related U.S. Application Data

(60) Provisional application No. 60/786,497, filed on Mar. 28, 2006, provisional application No. 60/885,312, filed on Jan. 17, 2007.

(51) Int. Cl.
*F16J 15/02* (2006.01)

(52) U.S. Cl. .................. 277/649; 277/651; 277/654

(58) Field of Classification Search .............. 277/649, 277/651, 654
See application file for complete search history.

(56) References Cited

U.S. PATENT DOCUMENTS

| | | | |
|---|---|---|---|
| 871,178 A * | 11/1907 | Ostrander | 428/167 |
| 1,883,609 A | 10/1932 | Dennis | |
| 2,211,045 A | 8/1940 | Balfe | |
| 2,616,736 A * | 11/1952 | Smith | 277/607 |
| 2,885,303 A * | 5/1959 | Kaplan | 442/76 |
| 3,140,342 A | 7/1964 | Ehrreich et al. | |
| 3,191,950 A | 6/1965 | Hiltner | |
| 3,608,914 A * | 9/1971 | Harby | 277/654 |
| 3,794,333 A | 2/1974 | Czernik et al. | |
| 3,936,059 A | 2/1976 | Gordon | |
| 4,037,009 A | 7/1977 | Severinsen | |
| 4,181,313 A | 1/1980 | Hillier et al. | |
| 4,234,638 A | 11/1980 | Yamazoe et al. | |
| 4,403,796 A | 9/1983 | Ledbetter et al. | |
| 4,529,257 A | 7/1985 | Goodman et al. | |
| 4,575,578 A | 3/1986 | Bogan et al. | |
| 4,620,995 A | 11/1986 | Otomo et al. | |
| 4,778,189 A | 10/1988 | Udagawa | |
| 4,828,275 A | 5/1989 | Udagawa | |
| 4,846,482 A * | 7/1989 | Blodgett et al. | 277/591 |
| 4,880,669 A * | 11/1989 | Dorn et al. | 427/210 |
| 4,913,951 A | 4/1990 | Pitolaj | |
| 5,222,745 A * | 6/1993 | Akbar et al. | 277/594 |
| 5,228,702 A | 7/1993 | Browne et al. | |
| 5,443,887 A | 8/1995 | Nakao | |
| 5,531,454 A | 7/1996 | Borneby | |
| 5,549,968 A | 8/1996 | Byers et al. | |

(Continued)

FOREIGN PATENT DOCUMENTS

EP    0 702 174 A    3/1996

(Continued)

*Primary Examiner* — Alison K Pickard
(74) *Attorney, Agent, or Firm* — Womble Carlyle Sandridge & Rice PLLC

(57) ABSTRACT

A gasket for creating a seal between two surfaces. The gasket may include a pervious base sheet and a permeating material applied to or incorporated into the base sheet. The gasket is formed by various methods disclosed herein. The gasket may include a base sheet, a primary sealing material covering the base sheet, and a secondary sealing material covering the primary sealing material.

18 Claims, 9 Drawing Sheets

U.S. PATENT DOCUMENTS

| | | |
|---|---|---|
| 5,618,050 A | 4/1997 | Jeanne et al. |
| 5,702,111 A | 12/1997 | Smith |
| 5,791,654 A | 8/1998 | Gaines et al. |
| 6,093,467 A | 7/2000 | Forry |
| 6,241,253 B1 | 6/2001 | Dempsey et al. |
| 6,247,703 B1 | 6/2001 | Forry et al. |
| 6,268,020 B1 | 7/2001 | Forry et al. |
| 6,454,276 B2 | 9/2002 | Gaines et al. |
| 6,460,861 B1 | 10/2002 | Castner |
| 6,530,575 B2 | 3/2003 | Poquet et al. |
| 6,530,577 B1 | 3/2003 | Busby et al. |
| 6,543,787 B1 | 4/2003 | Inciong |
| 6,623,832 B2 | 9/2003 | Greven |
| 6,626,439 B1 | 9/2003 | Forry et al. |
| 6,695,320 B2 | 2/2004 | Busby et al. |
| 6,702,296 B2 | 3/2004 | Forry |
| 6,733,015 B2 | 5/2004 | Forry et al. |
| 6,866,026 B2 | 3/2005 | Mickelson |
| 6,921,084 B2 | 7/2005 | Mickelson et al. |
| 6,923,998 B2 | 8/2005 | Forry et al. |
| 6,935,009 B2 | 8/2005 | Salameh |
| 7,014,193 B2 | 3/2006 | Forry |
| 7,278,639 B2 | 10/2007 | Forry et al. |
| 7,498,274 B2 * | 3/2009 | Flint et al. .......... 442/2 |
| 2003/0234498 A1 | 12/2003 | Busby et al. |
| 2004/0041356 A1 | 3/2004 | Smith et al. |
| 2004/0070156 A1 | 4/2004 | Smith et al. |
| 2004/0173978 A1 | 9/2004 | Bowen et al. |
| 2005/0242527 A1 | 11/2005 | Barth et al. |
| 2005/0280214 A1 | 12/2005 | Richards |

FOREIGN PATENT DOCUMENTS

| | | |
|---|---|---|
| EP | 1 610 042 A | 12/2005 |
| FR | 1.118.630 | 6/1956 |
| FR | 2 172 508 A | 9/1973 |
| FR | 2 367 960 A | 5/1978 |

\* cited by examiner

GASKET FORMED FROM VARIOUS MATERIAL

CROSS-REFERENCE TO RELATED APPLICATION

This application claims the benefit of U.S. Provisional Application Nos. 60/786,497, which was filed on Mar. 28, 2006, and 60/885,312, which was filed on Jan. 17, 2007. The entire content of the above-referenced provisional applications is hereby incorporated by reference as if presented herein in its entirety.

BACKGROUND OF THE INVENTION

The present invention generally relates to gaskets for sealing an interface between two components.

Gaskets have long been used to seal interfaces between components in a wide variety of machines, particularly in gasoline and diesel engines. For example, head gaskets are used to create a seal between the heads of an engine and an engine block; oil pan gaskets are used to create a seal between an oil pan and an engine block; and water pump gaskets are used to create a seal around the ports of a water pump. Most gaskets are designed specifically for their particular intended use. For example, head gaskets are designed to seal against high temperatures and pressures and the generally caustic environment within the cylinders of an engine. As another example, water pump gaskets are designed to prevent the leakage of coolant, which may consist of a mixture of water and anti-freeze that is heated and under pressure.

Two performance characteristics required of most compressible gaskets are compression resistance and sealability. Compression resistance refers to the ability of a gasket to withstand high compression forces when clamped between two flange surfaces without crushing, deforming, or yielding to the point that the mechanical properties of the gasket material and ultimately the seal provided by the gasket are compromised. Sealability refers to the ability of a gasket to resist or prevent leakage of fluid both between the gasket faces and the flanges between which the gasket is clamped (referred to as "interfacial leakage") and the ability to resist or prevent leakage of fluid through the gasket material itself (referred to as "interstitial leakage" or "bulk seal" properties).

Many different materials have been used to form gaskets. Metal gaskets traditionally have been favored because they generally have higher heat resistance, but are prone to failure in some applications due to a high level of precision needed to obtain a tight seal. In contrast, polymeric gaskets are able to conform to the surfaces more readily, but often fail over time due to chemical or physical changes in the polymer. Additionally, even prior to failure, polymeric gaskets often are perceived as failing due to oozing or creep from the sealed surfaces resulting from extrusion under pressure of the gasket. As used herein, "extrusion under pressure" refers to the radial or planar expansion or spreading of a gasket material when subject to a compression force normal to the plane of the gasket. Extrusion under pressure typically results in an undesirable permanent deformation or even destruction of the material. Thus, there is a need for an improved gasket with improved performance characteristics and sealing properties.

SUMMARY OF THE INVENTION

In one aspect, the invention is generally directed to a gasket having an upper face and a lower face. The gasket comprises a base sheet. The base sheet comprises a pervious material having interstitial spaces therein. The gasket further comprises a permeating material at least partially covering the base sheet and at least partially filling the interstitial spaces. The permeating material comprises a polymer material and has an upper patterned surface on the upper face of the gasket and a lower patterned surface on the lower face of the gasket.

In another aspect, the invention is generally directed to a gasket having an upper face and a lower face. The gasket comprises a base sheet and a primary sealing material for providing a bulk seal of the gasket. The primary sealing material at least partially covers the base sheet. A secondary sealing material at least partially covers the primary sealing material for providing an interfacial seal of the gasket.

In another aspect, the invention is generally directed to a method of forming a gasket having an upper face and a lower face. The method comprises providing a base sheet having interstitial spaces. The method further comprises at least partially covering the base sheet with a permeating material and at least partially filling the interstitial spaces. The method further comprises forming an upper patterned surface on the upper face of the gasket and forming a lower patterned surface on the lower face of the gasket.

In another aspect, the invention is generally directed to a method of forming a gasket having an opening, an upper face, and a lower face. The method comprises providing a base sheet and at least partially covering the base sheet with a primary sealing material. The primary sealing material is for providing a bulk seal of the gasket. The method further comprising at least partially covering the primary sealing material with a secondary sealing material. The secondary sealing material is for providing an interfacial seal of the gasket.

In another aspect, the invention is generally directed to a gasket comprising a base sheet formed of a mesh material and a coating of polymeric material on the based sheet. The coating is configured in a pattern defined by raised portions and lowered portions.

In another aspect, the invention is generally directed to a gasket comprising a wire mesh base sheet having first and second faces. A coating of polymeric material is on the base sheet. The coating being formed into a predetermined pattern on at least one face of the base sheet.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the invention.

BRIEF DESCRIPTION OF THE DRAWINGS

Corresponding reference characters indicate corresponding parts throughout the several views of the drawings.

DETAILED DESCRIPTION OF THE ILLUSTRATED EMBODIMENTS

Figure 1:
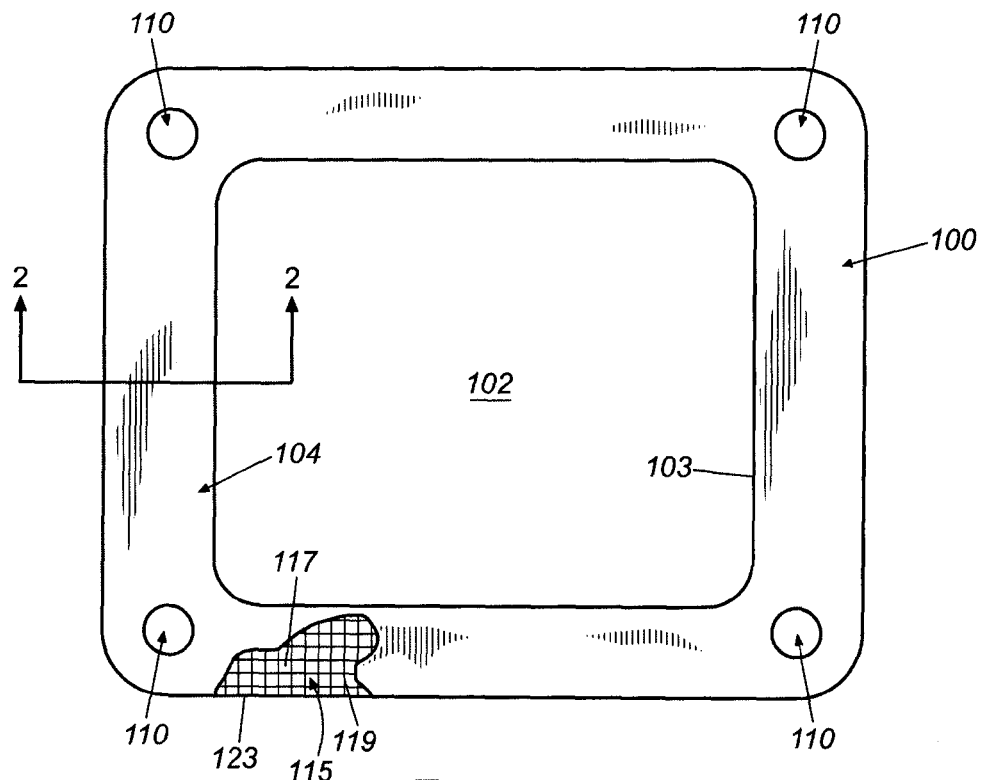
FIG. 1 is a plan view of an exemplary gasket according to various aspects of the invention.

The present invention generally relates to a device for creating a seal between two surfaces and, more particularly, relates to various gaskets that may have beneficial and/or improved performance characteristics (e.g., extrusion under pressure, compression resistance, heat resistance, and sealability, etc.). In one embodiment, the gasket generally includes a pervious base sheet with a penetrating material coated, deposited, applied, or otherwise integrated or incorporated into (sometimes collectively "applied to" and/or "incorporated into") the base sheet. The base sheet and permeating material are selected to obtain the desired heat resistance, compression resistance, and sealing robustness and durability of the resulting gasket. Additionally, the gasket may result in reduced extrusion under pressure and, therefore, improved aesthetics and performance.

The various gaskets of the present invention may be used for numerous applications including, but not limited to, intake manifold gaskets for internal combustion engines, oil pan gaskets, valve cover gaskets, fuel pump gaskets, differential cover gaskets, transmission cover gaskets, water pump gaskets, air conditioning compressor gaskets, gas meter gaskets, and a variety of coupling flange gaskets for industrial pipelines, steam conduits, and other plumbing connections.

Base Sheet

Any suitable base sheet may be used to form a gasket according to the present invention. It will be understood that the particular material selected will depend on the intended application for the gasket and the particular performance requirements for the application. In one particular embodiment, the base sheet may be selected from materials described herein that are sometimes referred to as being formed from "fibers", "wires", "strands", or "elements" with "interstitial spaces", "interstices", or "void volume" therebetween, collectively and generally referred to as a screen material. However, it will be understood that such terms are not intended to restrict the type of material used to form the base sheet. For example, the base sheet may be formed of materials that are pervious without being fibrous, for example, foams, and that such materials may have what is commonly termed "pores" or "openings", even though the term "interstices" is used.

In other embodiments, the base sheet may be a compressible or substantially rigid material that is not a pervious material and is substantially contiguous. A substantially contiguous base sheet would comprise a material that is uninterrupted across its flange width, that is, the base sheet would be substantially free from pores or interstitial spaces. The base sheet can comprise a fibrous gasket material of a predetermined thickness, or a material suitable for use as a rigid carrier (e.g., metal) of controlled compression rubber gaskets. The term "base sheet" when used alone without being identified as a base sheet of gasket material is intended to include rigid carriers and all other suitable base sheet materials.

In one embodiment, the base sheet is formed from a woven material, for example, a metal (wire-type) mesh or screen, a polymeric mesh, or any combination thereof. As used herein, the term "woven" refers to a fabric or material made or constructed by interlacing wires, threads, strips, fibers, or strands (collectively "strands") of material or other elements into a whole. Numerous variations of such materials are contemplated for use with the present invention. It will be understood that the number of strands per unit area, the strand diameter, and the percent open area may be varied depending on the requirements of the particular application.

The number of strands per unit area and the opening size may vary for a particular application. For example, where the base sheet is a wire mesh or screen, the screen may have any suitable mesh (number of openings per lineal inch), for example, from 5 mesh to 100 mesh. Specific examples include, but are not limited to, 5 mesh, 6 mesh, 8 mesh, 10 mesh, 12 mesh, 14 mesh, 16 mesh, 18 mesh, 20 mesh, 24 mesh, 30 mesh, 36 mesh, 40 mesh, 50 mesh, 60 mesh, 80 mesh, and 100 mesh.

Alternately, the base sheet may be formed from a nonwoven material (also referred to as a nonwoven "web" or "fabric"). As used herein, the term "nonwoven" material or fabric or web refers to a web having a structure of individual fibers or threads that are interlaid, but not in an identifiable manner as in a woven fabric. Nonwoven fabrics or webs have been formed from many processes including, but not limited to spunbonding processes, meltblowing processes, bonded carded web processes, felting processes, and needlepunching processes.

As used herein the term "spunbond fibers" refers to small diameter fibers of molecularly oriented polymer formed from a spunbonding process. Spunbond fibers are formed by extruding molten thermoplastic material as filaments from a plurality of fine, usually circular capillaries of a spinneret with the diameter of the extruded filaments then being rapidly reduced.

As used herein the term "meltblown fibers" refers to fine fibers of unoriented polymer formed from a meltblowing process. Meltblown fibers are often formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and deposited on a collecting surface to form a web of randomly disbursed meltblown fibers. Meltblown fibers may be continuous or discontinuous, and are generally smaller than 10 microns in average diameter. In one embodiment, meltblown fibers include fiberglass, or any other suitable material.

As used herein, "bonded carded web" refers to webs made from staple fibers that are sent through a combing or carding unit, which breaks apart and aligns the staple fibers in the machine direction to form a generally machine direction-oriented fibrous nonwoven web. Such fibers usually are purchased in bales that are placed in a picker that separates the fibers prior to the carding unit. Once the web is formed, it then is bonded by one or more of several known bonding methods. One such bonding method is powder bonding, wherein a powdered adhesive is distributed through the web and then activated, usually by heating the web and adhesive with hot air. Another suitable bonding method is pattern bonding, wherein heated calendar rolls or ultrasonic bonding equipment are used to bond the fibers together, usually in a localized bond pattern, though the web can be bonded across its entire surface if so desired. Another suitable bonding method is through-air bonding. In one embodiment, a bonded carded web includes aramid fibers or any other suitable material.

As used herein, a "felt" refers to a matted nonwoven material formed from natural and/or synthetic fibers, made by a combination of mechanical and chemical action, pressure, moisture, and heat.

As used herein, "needlepunching" refers to a process of converting batts of loose staple or continuous fibers, or a combination of staple fibers and continuous fibers, into a coherent nonwoven fabric in which barbed needles are punched through the batt, thereby entangling the fibers.

Any suitable material may be used to form a nonwoven material for use with the present invention. For example, the base sheet may be formed from glass fibers (fiberglass), carbon fibers, a polymeric material, or any combination thereof. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries. Typical thermoplastic and thermoset polymers that may be suitable for use with the present invention include, but are not limited to, polyolefins, e.g. polyethylene, polypropylene, polybutylene, and copolymers thereof; polytetrafluoroethylene; polyesters, e.g. polyethylene terephthalate; vinyl polymers, e.g., polyvinyl chloride, polyvinyl alcohol, polyvinylidene chloride, polyvinyl acetate, polyvinyl chloride acetate, polyvinyl butyral; acrylic resins, e.g. polyacrylate, polymethylacrylate, and polymethylmethacrylate; polyamides, e.g., nylon 6,6; polystyrenes; polyurethanes; cellulosic resins, e.g., cellulosic nitrate, cellulosic acetate, cellulosic acetate butyrate, ethyl cellulose; copolymers of any of the above materials; or any blend or combination thereof.

Alternatively still, any combination of synthetic or natural woven, nonwoven, and other materials, for example, papers or foams, may be used as the base sheet. Such materials may be layered and joined to form a composite or laminate or may be assembled or combined in any other suitable manner.

Permeating Material

According to various aspects of the invention, a material (e.g., a permeating material), is applied to or incorporated into the base sheet. Any suitable permeating material may be used to form the gasket, and is selected generally to engage, conform to the shape of, and adhere to the mating surfaces to provide the desired compression resistance and sealability for a particular application. In one aspect, the permeating material and base sheet are selected so that the permeating material penetrates a minimal amount of the thickness of the base sheet. In this aspect, the layer of permeating material sometimes may be referred to herein as a "face coating". In another aspect, the permeating material and base sheet are selected so that the permeating material penetrates only a portion of the thickness of the base sheet. In yet another aspect, the permeating material and base sheet are selected so that the permeating material penetrates substantially all of the thickness of the base sheet.

In each aspect, the permeating material is selected so that, upon compression, the permeating material and base sheet operate in concert to prevent interfacial and interstitial leakage, thereby creating an exceptional, sometimes perfect seal, even under non-ideal conditions. The various mechanisms by which the seal is achieved will be understood by those of skill in the art and described only briefly herein. When the gasket is compressed between two flange surfaces, the face coating (where present) or the permeating material proximate the flange surface tends to fill any imperfections such as scratches or roughness in the mating surfaces that otherwise might result in leakage. Further, the face coating or the permeating material proximate the flange surface tends to conform to any waviness or deviations from flatness in the mating surfaces that might occur, for example, with slightly warped flanges or with thin flanges that can deflect significantly between bolt holes.

The permeating material further is selected to be impervious to and substantially chemically non-reactive with the particular fluid that must be sealed. Any of the polymers or polymeric materials described above may be used in accordance with the present invention. Some particular examples of materials that may be suitable include, but are not limited to, elastomeric materials such as polyacrylates (ACM), ethylene-acrylic copolymers (AEM) such as VAMAC polymer available from E.I. du Pont de Nemours and Company, silicon rubber, acrylic, acrylonitrile butadiene rubber (NBR), hydrogenated nitrile butadiene rubber (HNBR), and styrene butadiene rubber (SBR), acrylic-acrylonitrile copolymers, carboxylated acrylonitrile polymer, carboxylated styrene butadiene polymer, polyvinylidene chloride, chloroprene rubber polymer, ethylene/vinyl acetate polymer, epoxy, fluorosilicones, and polyurethane. Any of the above materials may be UV curable, heat curable, or room temperature curable, or may require combinations of curing techniques. Any of the polymeric materials may include a variety of fillers such as, for example, silica, carbon black, or clay to provide material properties adapted to a particular fluid or condition to be sealed. Any of such materials also may include one or more additives as needed to attain the viscosity, color, flexibility, chemical resistance, UV resistance, and so forth.

The hardness of the permeating material may vary for a particular application, and for example, may range from approximately 20 to approximately 95 in Shore A hardness. In one aspect, the Shore A hardness of the permeating material may be from about 40 to about 80, from about 50 to 70, from about 50 to 60, from about 60 to about 70, for example, about 65. The permeating material also may exhibit some degree of tackiness.

The permeating material may be applied to or incorporated into the selected base sheet in any suitable amount as needed to minimize extrusion under pressure and achieve the desired compression resistance and sealability of the resulting gasket. At a particular point on the base sheet, the permeating material generally may be from 0 to about 99.9% of the total weight of the coated base sheet. In one aspect, the permeating material is from 0 to about 10 wt % of the coated base sheet. In another aspect, the permeating material is from about 10 to about 20 wt % of the coated base sheet. In yet another aspect, the permeating material is from about 20 to about 30 wt % of the coated base sheet. In another aspect, the permeating material is from about 30 to about 35 wt % of the coated base sheet. In yet another aspect, the permeating material is from about 35 to about 40 wt % of the coated base sheet. In a further aspect, the permeating material is from about 40 to about 50 wt % of the coated base sheet. In another aspect, the permeating material is from about 50 to about 60 wt % of the coated base sheet. In yet another aspect, the permeating material is from about 60 to about 70 wt % of the coated base sheet. In still another aspect, the permeating material is from about 70 to about 80 wt % of the coated base sheet. In a further aspect, the permeating material is from about 80 to about 90 wt % of the coated base sheet. In a still further aspect, the permeating material is from about 90 to about 99.9 wt % of the coated base sheet.

The permeating material may be incorporated into or selectively applied to the facial area of the base sheet in any suitable amount and in any pattern needed or desired for a particular application. For example, the permeating material may be applied in a ring, grid, stripe, or any other configuration. In one aspect, the permeating material is applied to or incorporated into greater than 0 to about 10% of the facial area of the base sheet. In another aspect, the permeating material is applied to or incorporated into from about 10 to about 20% of the facial area of the base sheet. In yet another aspect, the permeating material is applied to or incorporated into from about 20 to about 30% of the facial area of the base sheet. In another aspect, the permeating material is applied to or incorporated into from about 30 to about 40% of the facial area of the base sheet. In still another aspect, the permeating material is applied to or incorporated into from about 40 to about 50% of the facial area of the base sheet. In another aspect, the permeating material is applied to or incorporated into from about 50 to about 60% of the facial area of the base sheet. In yet another aspect, the permeating material is applied to or incorporated into from about 60 to about 70% of the facial area of the base sheet. In another aspect, the permeating material is applied to or incorporated into from about 70 to about 80% of the facial area of the base sheet. In still another aspect, the permeating material is applied to or incorporated into from about 80 to about 90% of the facial area of the base sheet. In still a further aspect, the permeating material is applied to or incorporated into from about 90 to about 100% of the facial area of the base sheet.

Depending on the amount of permeating material incorporated into the base sheet, the porosity or open area of the base sheet, the viscosity of the permeating material, and numerous other factors, the gasket may have a thickness that is from about 100% to about 105% of the thickness of the base sheet, from about 105% to about 110% of the thickness of the base sheet, from about 110% to about 115% of the thickness of the base sheet, from about 115% to about 120% of the thickness of the base sheet, from about 120% to about 125% of the thickness of the base sheet, from about 125% to about 130% of the thickness of the base sheet, from about 130% to about 135% of the thickness of the base sheet, from about 135% to about 140% of the thickness of the base sheet, from about 140% to about 145% of the thickness of the base sheet, from about 145% to about 150% of the thickness of the base sheet, from about 150% to about 155% of the thickness of the base sheet, from about 155% to about 160% of the thickness of the base sheet, or any other thickness.

While various ranges are set forth herein, it will be understood that numerous other values and ranges are contemplated hereby. Additionally, it will be understood that portions of the base sheet may have a greater or lesser percentage coating by weight, either by design or as a result of the inherent variations in the particular materials and processes used to apply the permeating material to the base sheet.

The permeating material may be applied to or incorporated into the pervious base sheet in any suitable form or manner needed to achieve the desired coating weight and pattern, for example, as a fusible powder, solid-filled polymer, a 100% solids fluid, a latex, or any combination thereof. It will be understood that permeating material may be applied as a composition including one or more additives that provide the desired viscosity, surface wetting, and other coating or extrusion properties that provide the desired film forming characteristics. For example, the permeating material may be applied as a composition having a viscosity of from about 100 to about 100,000 centipoise (cP), for example, from about 1000 to about 50,000 cP, for example, from about 2000 to about 25,000 cP. In one particular example, the composition has a viscosity of about 2500 cP. In another particular example, the composition has a viscosity of about 21,000 cP.

Primary and Secondary Sealing Materials

In some embodiments of the invention, the gasket may comprise a primary sealing material at least partially covering the base sheet and a secondary sealing material at least partially covering the primary sealing material. The primary sealing material provides a bulk seal and the secondary sealing material provides the interfacial seal of the gasket. The primary sealing material has strong bonding characteristics to the base sheet and provides structural strength to the gasket. The secondary sealing material comprises the upper and lower faces or contact surfaces and provides the interfacial seal of the gasket by providing the seal between the gasket faces and the flanges or sealing surfaces between which the gasket is clamped. Both the primary and secondary sealing materials have good thermal, chemical, and fluid permeation resistance against the fluid to be sealed.

In one particular embodiment, the primary sealing material is a polymeric coating and the secondary sealing material is a polymeric coating. The polymer coating of the primary sealing material and secondary sealing material can include the same or different material class without departing from the invention. In one embodiment, a suitable primary sealing material includes a polymer that is strong, well cross-linked, and is capable of adhering strongly to the base sheet. Suitable polymers for the primary sealing material include polymers with relatively high glass transition temperatures ($T_g$) and low to zero filler loading, and polymers with low $T_g$ and relatively high filler loadings (e.g., for strength reinforcement and/or cost reduction). In one embodiment, the primary sealing material includes a polymer with a $T_g$ in the range of approximately 20° C. to approximately 40° C. In another embodiment, the sealing material includes a polymer with a $T_g$ of approximately −50° C. and a substantial amount of filler loading. Also, the primary sealing material may be relatively hard, with a Shore A hardness ranging from approximately 40 to approximately 95, preferably in the range of approximately 60 to approximately 85.

In one embodiment, a suitable secondary sealing material includes a polymer that is relatively soft and has good conformability so that the gasket faces conform well to the flanges or sealing surfaces. Suitable polymers for the secondary sealing material include polymers having a low $T_g$ and/or minimal or zero filler loading. In one embodiment, suitable secondary sealing materials include polymers having a $T_g$ no higher than approximately −10° C. and a Shore A hardness in the range of approximately 5 to approximately 75, preferably between approximately 15 and approximately 60.

It is understood that the primary sealing material and secondary sealing material may comprise any suitable "polymer" and "polymeric materials" or type of polymer generally noted above for the permeating material, or the primary and secondary sealing materials may comprises any other suitable material. In one exemplary embodiment, the primary sealing material includes a fluoroelastomer polymer, such as TECNOFLON TN latex that is commercially available from Solvay Solexis, Inc. of Thorofare N.J., and other additives with the primary sealing material being formulated and cured such that the primary sealing material exhibits a $T_g$ of approximately −14° C., a Shore A hardness of approximately 82 and a tensile strength of approximately 1550 psi. In another exemplary embodiment, the primary sealing material includes an acrylic latex, such as HYSTRETCH V-29 acrylic latex that is commercially available from the Noveon, Inc. of Cleveland Ohio, and other additives with the material being formulated and cured such that the primary sealing material exhibits a $T_g$ of approximately −29° C., a Shore A hardness of approximately 65, and a tensile strength of approximately 850 psi. In another embodiment, the primary sealing material includes a styrene butadiene rubber, such as BUTOFAN NS-432 SBR latex that is commercially available from BASF Corporation of Germany, and other additives with the material being formulated and cured such that the primary sealing material exhibits a $T_g$ of approximately −25° C., a Shore A hardness of approximately 76, and a tensile strength of approximately 1000 psi.

In one exemplary embodiment, the secondary sealing material includes a fluoroelastomer polymer, such as TECNOFLON TN latex that is commercially available from Solvay Solexis, Inc. of Thorofare N.J., and other additives with the secondary sealing material being formulate and cured such that the primary sealing material exhibits a $T_g$ of approximately −14° C., a Shore A hardness of approximately 65 and a tensile strength of approximately 650 psi. In another exemplary embodiment, the secondary sealing material includes a solvent-based fluroelastomer and other additives with the material being formulated and cured such that the primary sealing material exhibits a $T_g$ of approximately −30° C., a Shore A hardness of approximately 54, and a tensile strength of approximately 800 psi. In another embodiment, the secondary sealing material includes an acrylic polymer, such as HYSTRETCH V-29 acrylic latex that is commercially available from the Noveon, Inc. of Cleveland Ohio, and other additives with the material being formulated and cured such that the secondary sealing material exhibits a $T_g$ of approximately −29° C., a Shore A hardness of approximately 22, and a tensile strength of approximately 510 psi. In another embodiment, the secondary sealing material includes an acrylic polymer, such as HYSTRETCH V-43 acrylic latex that is commercially available from the Noveon, Inc. of Cleveland Ohio, and other additives with the material being formulated and cured such that the secondary sealing material exhibits a $T_g$ of approximately 43° C., a Shore A hardness of approximately 18, and a tensile strength of approximately 500 psi.

The exemplary primary and secondary sealing materials listed herein are intended to illustrate suitable materials for certain embodiments of the invention, but the listing of exemplary materials is not intended to limit the scope of the invention. Further, the primary and secondary sealing materials may be other suitable materials than the specific materials described herein without departing from the scope of the invention.

Optional Release Coating

If desired, a gasket according to the invention may include a release coating to reduce undesired adhesion to mating surfaces and to make a spent gasket easier to remove after use. Release coatings typically are very thin, usually having a coating thickness of less than approximately 0.001 inch (0.025 mm), and are designed to be surface coatings that do not penetrate the base sheet of the gasket. Accordingly, release coatings typically do not detrimentally affect the compression resistance of the gasket material. One example of a commonly used release coating is a mica or vermiculite dispersion.

Process for Forming the Gasket

Numerous processes may be used to form the various gaskets described herein. For example, where the base sheet is provided as a rolled material, the base sheet may be unwound and subject to one or more dipping, coating, spraying, printing, extrusion, lamination, or other processes to incorporate the permeating material and/or the primary sealing material and secondary sealing material. Where the permeating material (and/or primary sealing material and secondary sealing material) is applied or incorporated to only a portion or portions of the base material, the permeating material may be applied selectively to the base material. Alternatively, a removable mask may be used to shield the base sheet in the areas not intended to be coated with the permeating material and/or primary sealing material and secondary sealing material. In yet another alternative, the permeating material and/or primary sealing material and secondary sealing material may be applied to the base sheet and selectively removed as desired to form the gasket. The permeating material or materials also may be "printed" onto the base sheet in a process that may be reminiscent of an ink jet printer. While examples of processes are provided herein, it will be understood that various other processes may be used to make a gasket according to the present invention.

Further, it is understood that gaskets of the type having a base sheet, a primary sealing material, and a secondary sealing material, as noted above, can be formed from any of the exemplary processes described herein, or may be formed from various other suitable processes.

EXEMPLARY EMBODIMENTS

Various aspects of the invention may be illustrated further by referring to the figures. For purposes of simplicity, like numerals may be used to describe like features. It will be understood that where a plurality of similar features are depicted, not all of such features are necessarily labeled on each figure. While various exemplary embodiments are shown and described in detail herein, it also will be understood that any of the features may be used in any combination, and that such combinations are contemplated hereby.

Figure 2:
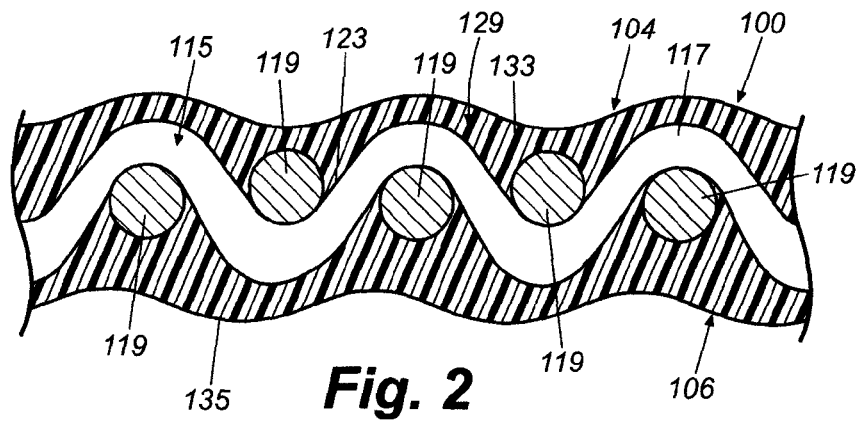
FIG. 2 is a schematic representation of a cross-section of the gasket of FIG. 1A taken along a plane including line 2-2.

FIGS. 1 and 2 depict an exemplary gasket 100 according to various aspects of the invention. The gasket 100 has an axial opening 102, an edge 103 forming the axial opening, an upper face 104, and a lower face 106. In the illustrated embodiment, the gasket 100 has bolt holes 110 in respective corners of the gasket 100 for receiving bolts (not shown) that draw the flanges or sealing surfaces together thus compressing the gasket between the flanges to form a seal. The upper face 104 and lower face 106 contact respective sealing surfaces and the bolts are tightened to compress the gasket 100 between the sealing surfaces to create a seal and prevent the leakage of fluid between the two mating surfaces. While a simple rectangular gasket 100 is illustrated herein, it will be appreciated that the gasket may have any shape needed or desired for a particular application. Further, while a gasket with a single aperture is shown herein, it will be understood that a gasket according to the present invention may be configured with two or more apertures and each aperture may seal against a different type of fluid. The present invention is applicable to any or all gasket configurations.

As shown in FIGS. 1 and 2, the gasket 100 includes a pervious base sheet 115 in the form of a wire mesh having generally parallel first elements 117 and transversely extending second elements 119. The base sheet 115 has interstitial spaces 123 between the intersecting first and second elements 117, 119. In the illustrated embodiment, the base sheet 115 is a steel wire mesh material, but the base sheet may have other configurations and include other materials without departing from the invention.

In the illustrated embodiment, the gasket 100 includes a permeating material 129 covering the base sheet and filling the interstitial spaces 123. In the illustrated embodiment, the permeating material 129 covers substantially all of the base sheet and comprises substantially all of the surface area of the upper face 104 and substantially all of the surface area of the lower face 106. In other embodiments, the permeating material 129 may be otherwise arranged so as only to cover selected portions of the base sheet 115 and/or only fill the interstitial spaces 123 partially.

In the embodiment of FIGS. 1 and 2, the permeating material 129 is applied in a manner so that the material fills the interstitial spacing of the screen mesh base sheet to provide structural strength to the gasket 100 and bulk sealing properties. Also, the permeating material 129 adheres to the intersecting first and second elements 117, 119 so as to form a top and bottom layer 133, 135, respectively forming the upper face 104 and the lower face 106 of the gasket 100. The upper face 104 and lower face 106 of the gasket 100 contact the flange or sealing surfaces and conform to the flange or sealing surfaces so as to create a fluid-tight interface to prevent leakage of fluid between the sealing surface and the respective face of the gasket. In this way, the permeating material 129 enhances both the bulk sealing properties of the gasket 100 and the interfacial sealing properties of the gasket.

Figure 3:
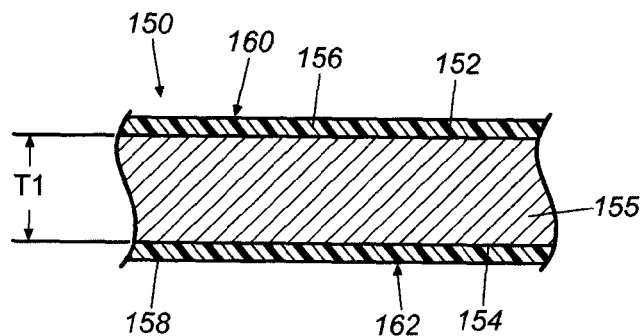
FIG. 3 is a schematic representation of a cross-section of a segment of another exemplary gasket according to various aspects of the invention.

FIG. 3 shows a schematic of an alternative embodiment of the gasket 150. In this embodiment, the gasket 150 has a substantially planar and continuous base sheet 155 with a maximum thickness T1 and opposed surfaces 152 and 154. A top layer 156 of permeating material is applied to the top surface 152 and a bottom layer 158 of permeating material is applied to the bottom surface 154. In this example, the layers 156 and 158 of permeating material are disposed substantially on the surfaces 152 and 154 of the base sheet 105 with minimal permeation into the thickness of base sheet 105, thereby forming the two opposed, substantially parallel gasket faces 160 and 162 that lie in respective spaced planes. However, depending on the materials selected as the base sheet 155 and the permeating material, it will be understood that some of the permeating material may extend into and reside within interstices or voids in the base sheet, particularly when the gasket 150 is under compression. In the illustrated embodiment, each layer 156, 158 of permeating material is substantially continuous, that is, without voids or interruptions. It is understood that the layers 156, 158 of permeating material may have voids or interruptions without departing from the invention.

Figure 4:
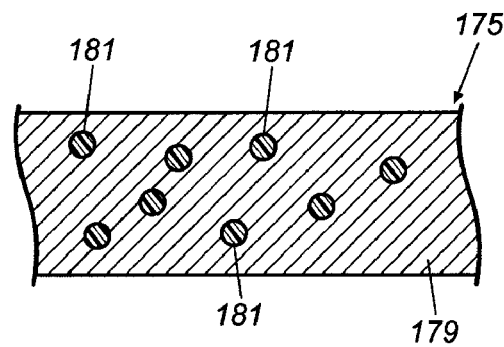
FIG. 4 is a schematic representation of a cross-section of a segment of yet another exemplary gasket according to various aspects of the invention.

FIG. 4 is a cross-sectional segment of another exemplary gasket 175 according to various aspects of the invention. The gasket 175 includes a pervious base sheet 179 having a permeating material 181 incorporated therein. In this example, the permeating material 181 substantially penetrates the base sheet 179, such that the voids or interstices in the base sheet are filled substantially with the permeating material. In this embodiment, the base sheet 179 with permeating material 181 is substantially continuous across the gasket, however the gasket 175 may only have permeating material selectively incorporated into only a portion of the base sheet without departing from the invention. Also, the loading of permeating material may be reduced so that during use, the permeating material sufficiently fills the interstices of the pervious material to create a continuous matrix without an unacceptable degree of extrusion under pressure.

Figure 5:
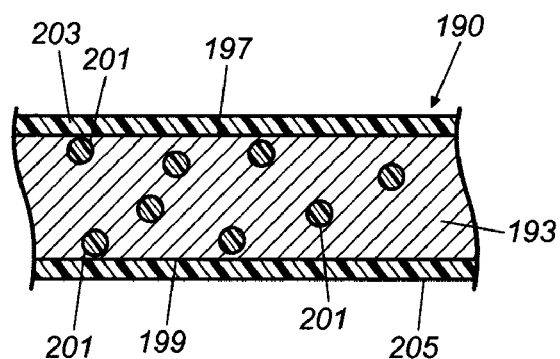
FIG. 5 is a schematic representation of a cross-section of a segment of still another exemplary gasket according to various aspects of the invention.

FIG. 5 is a cross-sectional segment of yet another exemplary gasket 190 according to various aspects of the invention. The gasket 190 includes a pervious base sheet 193 having opposed substantially parallel surfaces 197, 199. The base sheet 193 has voids or interstices 201 that are substantially filled with permeating material. The base sheet 193 with the permeating material therein is substantially continuous. Also, the base sheet 193 is covered by a top layer 203 of permeating material that overlies at least a portion of the top surface 197. The base sheet 193 is covered by a bottom layer 205 of permeating material that overlies at least a portion of the bottom surface 199 of the base sheet.

Figure 6:
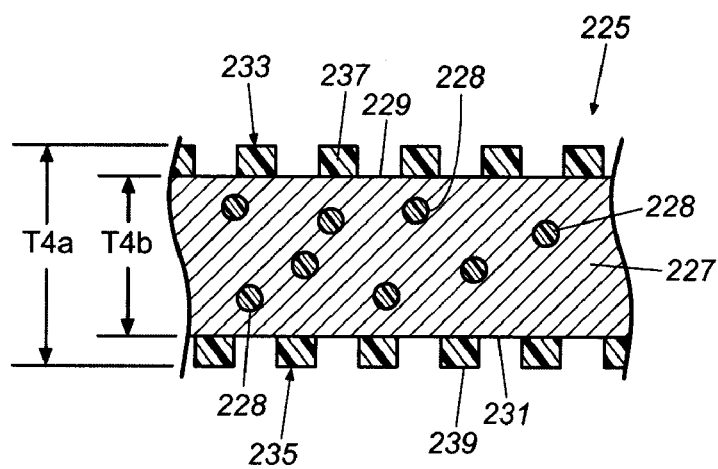
FIG. 6 is a schematic representation of a cross-section of a segment of yet another exemplary gasket according to various aspects of the invention.

FIG. 6 is a cross-sectional segment of yet another exemplary gasket 225 according to various aspects of the invention. The gasket 225 includes a pervious base sheet 227 having opposed substantially parallel surfaces 229, 231. The base sheet 227 has voids or interstices 228 substantially filled with permeating material. The base sheet 227 with permeating material filling the voids 228 is substantially continuous. In this embodiment, a layer 233 of permeating material overlies at least a portion of the first surface 229 of the base sheet 227. Likewise, a layer 235 of permeating material overlies at least a portion of the second surface 231 of the base sheet 227. In this example, the layers 233, 235 are applied or formed to have a predetermined pattern of projections 237, 239 respectively projecting from the surfaces 229, 231, such that the overall thickness of the gasket 225 varies with the pattern across the surface area of the gasket. For example, the thickness of the gasket 225 is T4*a* at a point corresponding to the maximum thickness of the upper and lower layers 233, 235 of permeating material, and the gasket has a thickness T4*b* at a point corresponding to the minimum thickness of the upper and lower layers 233, 235. Although the gasket 225 of this embodiment is shown generally to have two thicknesses corresponding to coated and uncoated regions of the base sheet 227, it will be understood that various topographies are contemplated by the invention. For example, the layers 233, 235 could substantially coat the entire surfaces 229, 231 of the base sheet 227 and/or the projections 237, 239 could be varying heights across the surfaces of the base sheet. Further, although the exemplary gasket 225 of this embodiment illustrates patterned surface layers 233, 235 on respective surfaces 229, 231 of the base sheet 227, it will be understood that either or both surfaces of the base sheet may include such patterned layers, the surfaces may or may not include identically shaped projections, and the projections of the surfaces may or may not be arranged in a regular, predetermined pattern or in registration.

Figure 7A:
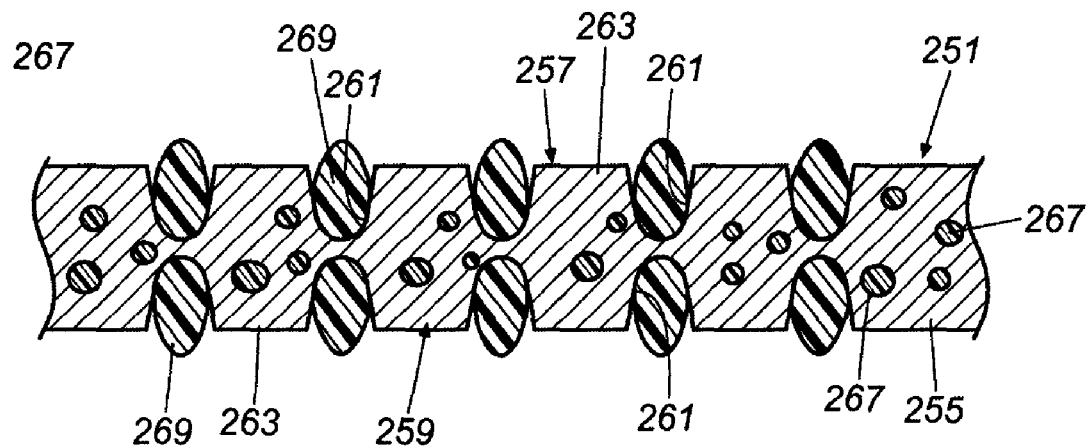
FIG. 7A is a schematic representation of a cross-section of a segment of yet another exemplary gasket according to various aspects of the invention.
Figure 7B:
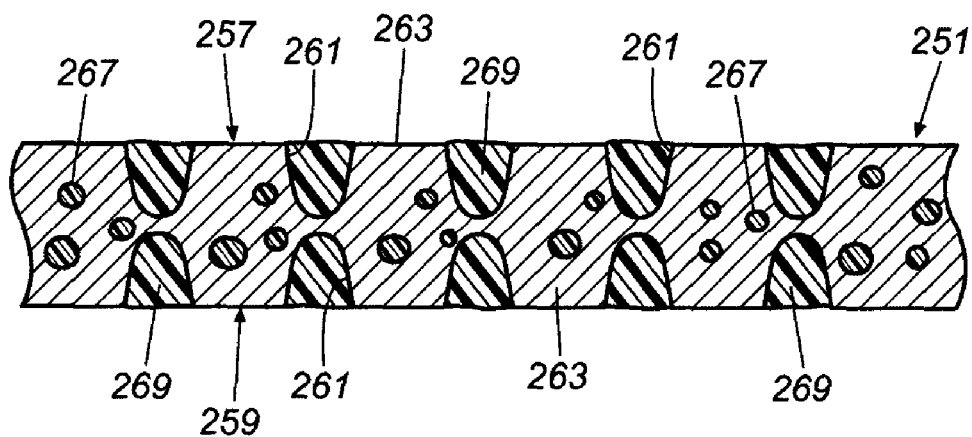
FIG. 7B is a schematic representation of the gasket segment of FIG. 7A after compression.

FIG. 7A is a cross-sectional segment of yet another exemplary gasket 251 according to various other aspects of the invention. The gasket 251 includes a pervious base sheet 255 having contoured or patterned surfaces 257, 259. Each surface 257, 259 includes at least one recessed portion 261 and at least one protruding portion 263 between adjacent recessed portions. The base sheet 255 includes voids or interstices 267 having permeating material incorporated throughout. In this embodiment, the gasket 251 includes permeating material 269 disposed within the recessed portions 261 of the top and bottom surfaces 257, 259. The permeating material 269 may be otherwise arranged so as to be disposed in less than all of the recessed portions 261 without departing from the invention. The amount of permeating material 269 in each recessed portion 261 may vary for a particular application. If desired, the amount of permeating material 269 of the gasket 251 may be selected so that there is little or no extrusion under pressure when the gasket 251 is compressed (FIG. 7B). As shown in FIG. 7B showing the compressed state of the gasket 251, the permeating material 269 fills the recessed portions 261 and any available interstitial space upon compression of the gasket between two sealing surfaces.

Figure 8A:
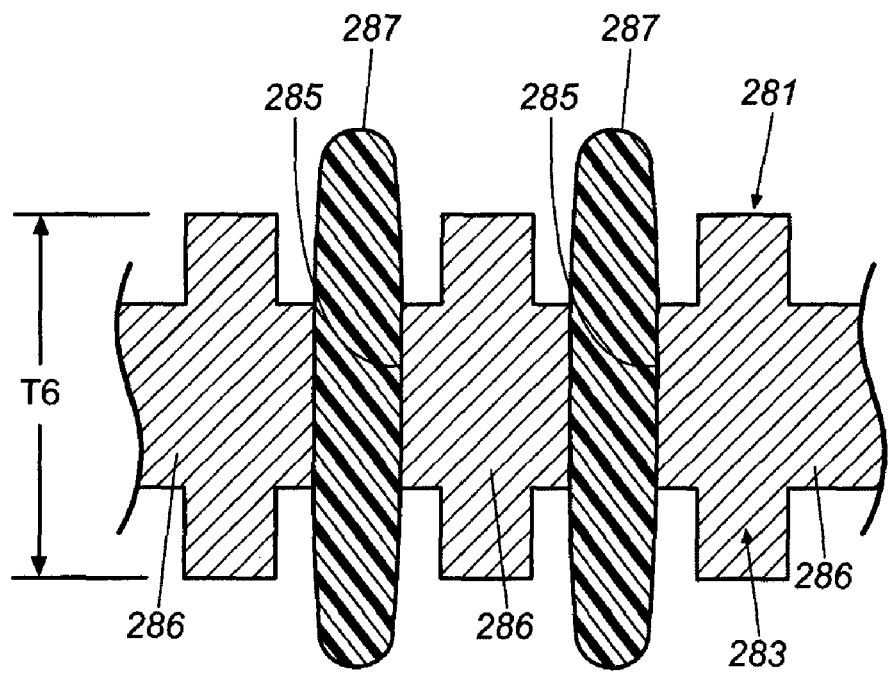
FIG. 8A is a schematic representation of a cross-section of a segment of a further exemplary gasket according to various aspects of the invention.
Figure 8B:
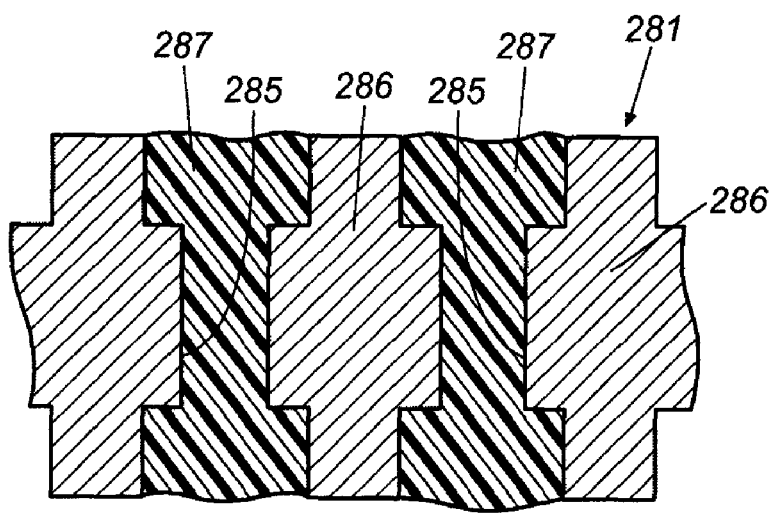
FIG. 8B is a schematic representation of the gasket segment of FIG. 8A after compression.

FIG. 8A depicts a schematic cross-sectional segment of still another exemplary gasket 281 according to various other aspects of the invention. In this example, the gasket 281 includes a pervious base sheet 283 in the form of a fiber or wire mesh or scrim having at least one interstitial space 285 between the elements 286 of the mesh. In this embodiment, the permeating material 287 is incorporated throughout the interstitial spaces 285 of the pervious base sheet 283. The permeating material 287 may fill substantially the void volume (not shown) of the base sheet 283 or may be applied selectively in a predetermined pattern. If desired, the amount of permeating material 287 may be selected such that under compression, the permeating material fills the interstitial spaces with minimal or no extrusion under pressure when the gasket 281 is compressed (FIG. 8B). As shown in FIG. 8B showing the compressed state of the gasket 281, the permeating material 287 substantially fills the space between the elements 286 of the mesh base sheet 283 when the gasket is compressed between two sealing surfaces.

Figure 9:
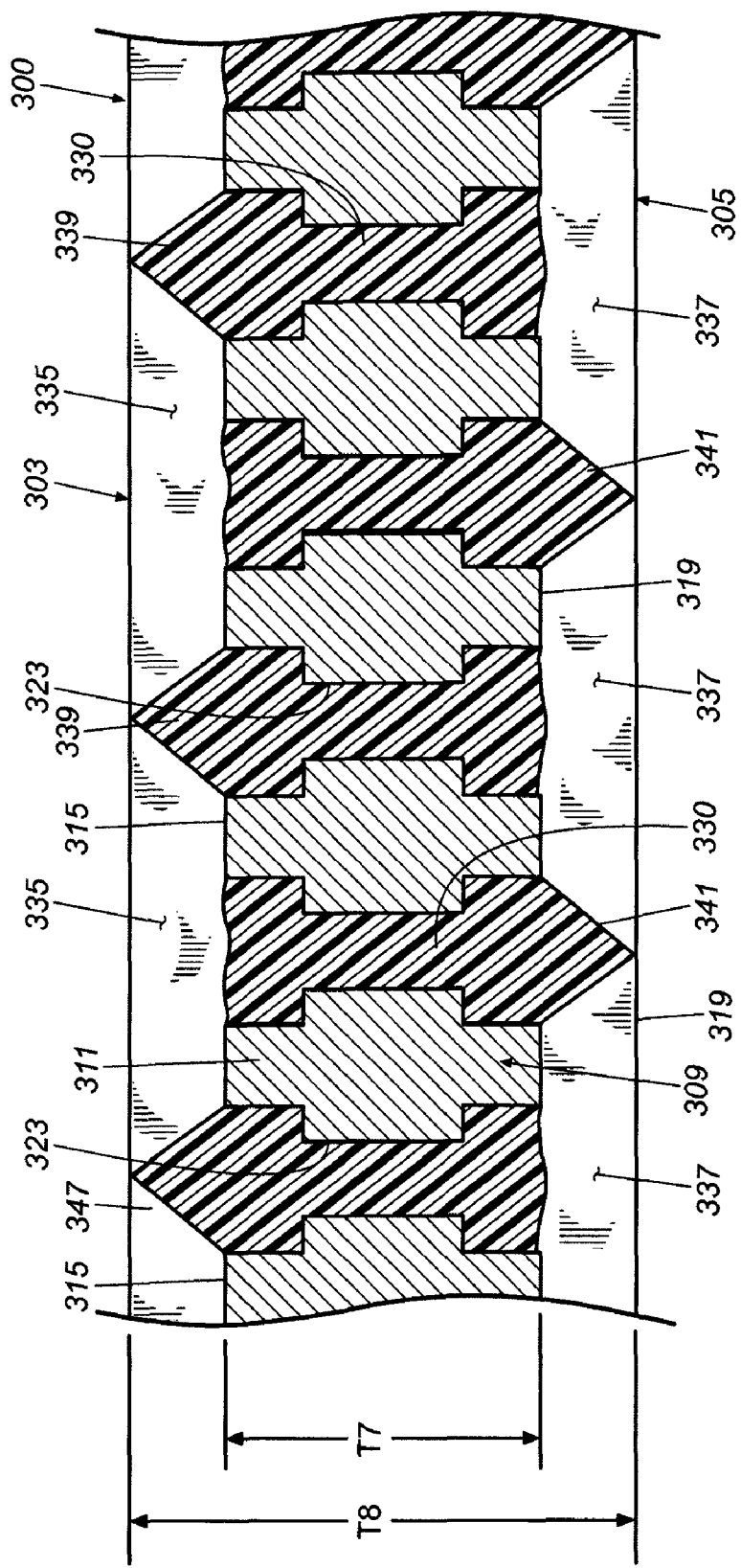
FIG. 9 is a schematic representation of a cross-section of a segment of yet another exemplary gasket according to various aspects of the invention.
Figure 10:
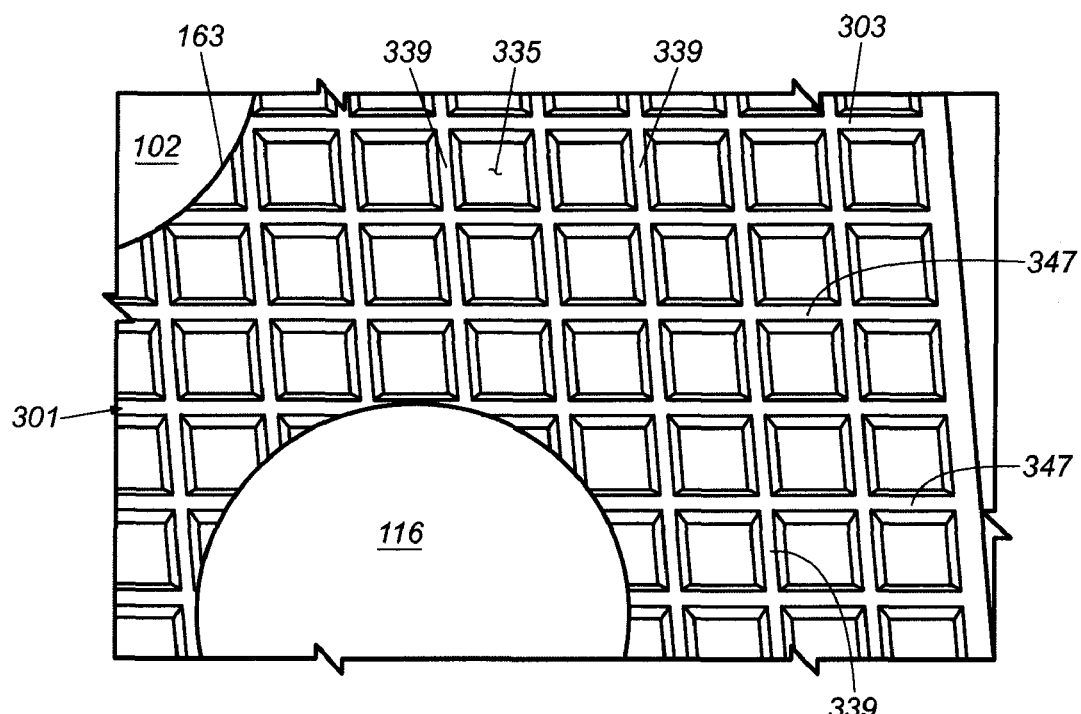
FIG. 10 depicts an enlarged portion of a plan view of the gasket of FIG. 9A.

FIGS. 9-10 depicts various views of another exemplary gasket 300 according to various other aspects of the invention. In general, this embodiment has a wire mesh screen base sheet 309 similar to the base sheet material of previously described embodiments. The mesh screen base sheet 309 is coated and permeated with an appropriate polymer that is chosen for its sealing characteristics when clamped between flange surfaces. The polymer coating on each face of the base sheet 309 is embossed, impressed, molded, printed, or otherwise formed to define a textured surface that, in the preferred embodiment, resembles the surface of a waffle. More particularly, the polymer coating is formed with intersecting ridges and troughs that define multitudes of roughly square depressions surrounded by raised walls of the polymer material. The floors of the depressions are generally located at the surface of the base sheet, while the walls project away from the base sheet. When the gasket 300 of this embodiment is clamped between two surfaces, each cell of the embossed waffle-like surface forms a small independently sealed region. Hundreds or thousands of these sealed regions are formed across the face of the gasket 300, which creates an interfacial seal of very high integrity since fluid must breach a multitude of independent and adjacent seals in order to escape the joint. Interstitial leakage is prevented because the polymer material completely permeates the spaces of the screen mesh base sheet 309. The wire mesh of the base sheet 309 limits and gauges the spacing between the flange or sealing surface to prevent the polymer material from being crushed beyond its elastic limits. A gasket 300 according to this embodiment will now be described in greater detail.

As shown in FIGS. 9 and 10, the gasket 300 has a first (e.g., upper) face 303 and a second (e.g., lower) face 305. The gasket includes a pervious base sheet 309 in the form of a wire mesh having first elements 311 (e.g., wires or strands) arranged in a preferably parallel relationship. Each of the first elements 311 of the base sheet 309 has a first surface 315 and a second surface 319 corresponding with the respective first and second face 303, 305 of the gasket 300. A series of interstitial spaces 323 are defined by and located between adjacent elements 311 of the base sheet 309. The spaces 323 extend through the thickness T7 of the base sheet 309. It is understood that the base sheet 309 includes transversely extending second elements (not shown but similar to elements 117 of FIG. 1) that are overlapped or interwoven with the parallel elements 311 shown in the cross-section of FIG. 9. The second elements 327 are similar in cross-sectional shape as the first elements 311 and further define the interstitial spaces 323 of the base sheet 309 so that the first and second elements form a grid pattern of the pervious base sheet.

A permeating material 330 is incorporated throughout the spaces 323 of the pervious base sheet 309. In the illustrated embodiment, the permeating material 330 fills the void volume of the interstitial spaces 323 of the base sheet 309. The permeating material 330 may be configured by embossing, printing, or otherwise to form a patterned surface of the upper face 303 of the gasket 300 having multiple recesses 335 arranged in a grid or other suitable arrangement. In the illustrated embodiment, the permeating material 330 also forms a patterned surface of the lower face 305 of the gasket 300 that has multiple recesses 337 and is similarly shaped and arranged as the patterned surface of the upper face 303. In the illustrated embodiment, the permeating material 330 is located in adjacent interstitial spaces 323 (as viewed in the cross-sectional view of FIG. 9) and has either a respective upper projection 339 or a respective lower projection 341. The upper projections 339 form the patterned upper surface of the upper face 303 and the lower projections 341 form the patterned lower surface of the lower face 305. In the illustrated embodiment, each projection 339, 341 projects away from a respective surface 315, 319 of the adjacent first elements 311 to a point that defines the overall thickness T8 of the gasket 300.

As shown in FIGS. 9 and 10, the transversely extending second elements forming the base sheet 309 have corresponding upper projections 347 projecting from interstitial spaces between the second elements. Similarly and as shown in FIG. 9, the transversely extending second elements have corresponding lower projections 351 projecting from interstitial spaces between the second elements. The upper projections 339 on the first elements 331 intersect with the upper projections 347 on the second elements 327 of the base sheet to form the recesses 335 of the patterned surface on the upper face 303 of the gasket 300. Similarly, the lower projections 341 on the first elements 311 intersect with the lower projections 351 on the second elements 327 of the base sheet to form the recesses 337 of the patterned surface on the lower face of the gasket 300.

In the illustrated embodiment, the upper and lower surfaces 315, 319 of the first elements 311 of the base sheet 309 are at least partially free from coverage with the permeating material 330 at locations corresponding to the upper and lower recesses 335, 337. Alternatively, one or both of the upper and lower surfaces 315, 319 of the first and second elements may be at least partially covered with permeating material 330 at locations corresponding to the upper and lower recesses 335, 337 without departing from the scope of this invention. Although only the first elements 311 are shown in the cross-section of FIG. 9, it is understood that the second elements 327 may be similarly shaped and arranged with respect to the permeating material 330 that forms the upper and lower projections 347, 351. Further, the upper projections 339, 347 and/or lower projections 341, 351 could be otherwise shaped (e.g., rounded, irregular, etc.) and arranged (e.g., having an irregular pattern or spacing) from what is illustrated and described herein without departing from the scope of this invention.

In the illustrated embodiment, the upper and lower patterned surfaces 303, 305 of the gasket 300 each include at least one complete recess 335, 337 that is located between the edge 361 of the gasket adjacent the aperture 102 and each of the bolt holes 110. That is, the upper projections 339, 347 on the upper face 303 should be arranged so that at least one recess 335 is completely enclosed on all four side by permeating material 330 between the edge 361 and the bolt hole 110 to inhibit the flow of fluid at the upper face between the aperture 102 and the bolt hole. Similarly, the lower projections 341, 351 on the lower face 305 should be arranged so that at least one recess 337 is completely enclosed on all four sides by permeating material 330 between the edge 361 and the bolt hole 110 to inhibit flow of fluid at the lower face of the gasket from the aperture 102 to the bolt hole. The recesses 335, 337 may be alternatively shaped (e.g., having other than four sides), but the gasket 300 should include at least one fully enclosed recess between the edge 361 and the bolt hole 110 to improve sealability of the gasket.

Figure 9A:
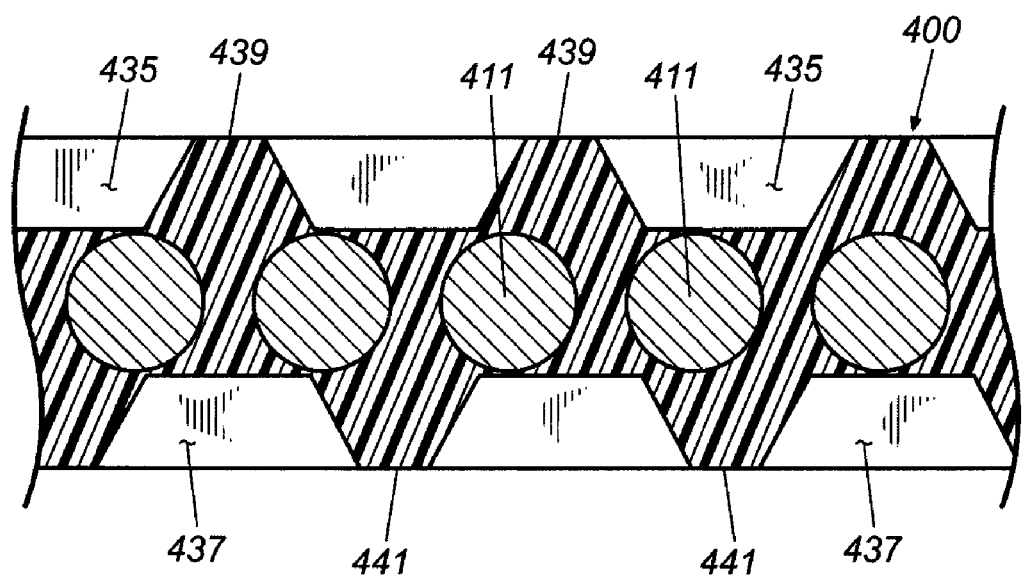
FIG. 9A is a schematic representation of a cross-section of a segment of yet another exemplary gasket according to various aspects of the invention.

The gasket 300 may have first elements 311 and/or second elements, or other parts or components, being otherwise shaped and/or arranged. For example, FIG. 9A is a schematic cross-section of a gasket 400 having similar shape and construction as the gasket 300 but with the first elements 411 having a generally circular cross-sectional shape. In FIG. 9A, like reference numbers as to the reference numbers shown in FIG. 9 indicate like or similar elements, with the reference numbers in FIG. 9A being in the 400-series (e.g., having a "4" prefix").

Figure 9B:
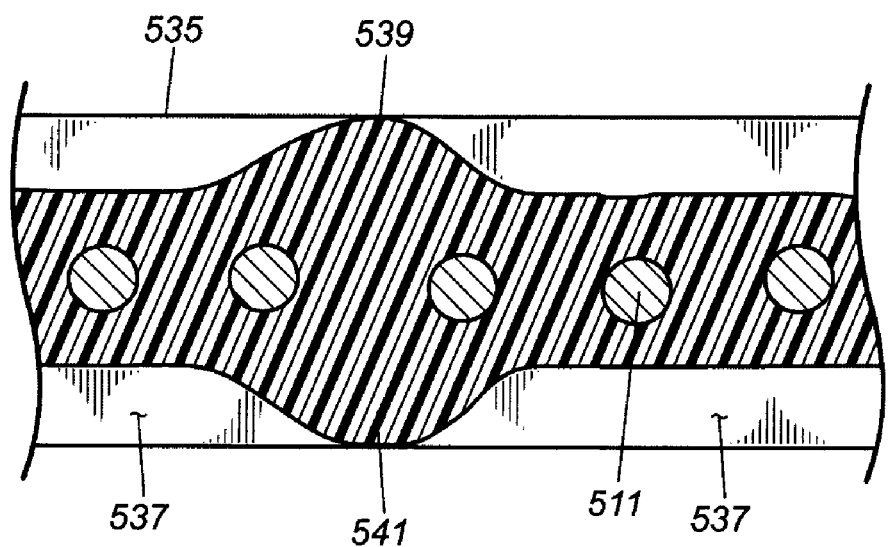
FIG. 9B is a schematic representation of a cross-section of a segment of yet another exemplary gasket according to various aspects of the invention.

Similarly, FIG. 9B is a schematic cross-section of a gasket 500 having similar shape and construction as the gasket 400 except the permeating material is arranged to provide a layer of material substantially covering the first elements 511 in the recesses 535, 537 of the patterned surfaces 503, 505. Furthermore, the upper and lower projections 339, 341 are spaced further apart so that the recesses 535, 537 of the patterned surfaces 503, 505 are larger than the recesses of the previous embodiments. Also, the projections 539, 541 of the gasket 500 are rounded to create a smoother contact surface on the upper and lower face of the gasket.

The gasket 300, 400, 500 with corresponding patterned surfaces may be made by any suitable process or technique. One method for forming the gasket includes coating a continuous roll of mesh base sheet material with liquid polymer permeating material and allowing the permeating material to dry. The base sheet material may be immersed in a container of polymeric fluoroelastomer coating. The coated base sheet material may be removed from the coating and allowed to dry. Next, the coated base sheet material may be heated in an oven to allow at least partial curing of the permeating material. At this stage, the coated base sheet material may be cut into appropriate shapes corresponding to the desired shape of the gasket by a cutting die. The cut part may be placed between a press to flatten any curled edges from the die cutting process. Next, the cut part may be pressed between two heated plates each having a machined surface for forming the respective upper and lower patterned surface of the gasket. After forming the patterned upper and lower surfaces, the gasket 300, 400, 500 may be further heated to complete the cure cycle of the fluoroelastomer polymer.

Various alternative methods and steps may be used in forming the gasket 300, 400, 500. For example, calendared rolls may be used to maintain the uniformity of the grid patterns. Further, heated embossing rolls may be used instead of a flat press. In another alternative method, the mesh base sheet material is coated with liquid polymer permeating material and dried and then the projections from the grid patterns on the upper and lower faces of the gasket are applied by suitable printing techniques (e.g., screen printing, gravure printing, flexographic printing, lithographic printing, ink jet-type printing, other automatic dispensing methods, etc.). In a further alternative method, a thin film of permeating material may be applied to the base sheet material by various suitable lamination techniques and then a heated embossing roll used to form the permeating material into the grid patterns of the gasket.

It is understood that the above methods and techniques for forming the gasket 300, 400. 500 are illustrative are not intended to be limiting. Further, the methods and techniques may include other processes or steps not discussed in detail herein without departing from the scope of this invention. For example, any of the above techniques and methods for forming the gasket may utilize either a continuous roll of base sheet material or a precut sheet of base sheet material. Furthermore, any of the above techniques and method may utilize only a partial coating of the base sheet material with permeating material rather than a complete coating.

Figure 11:
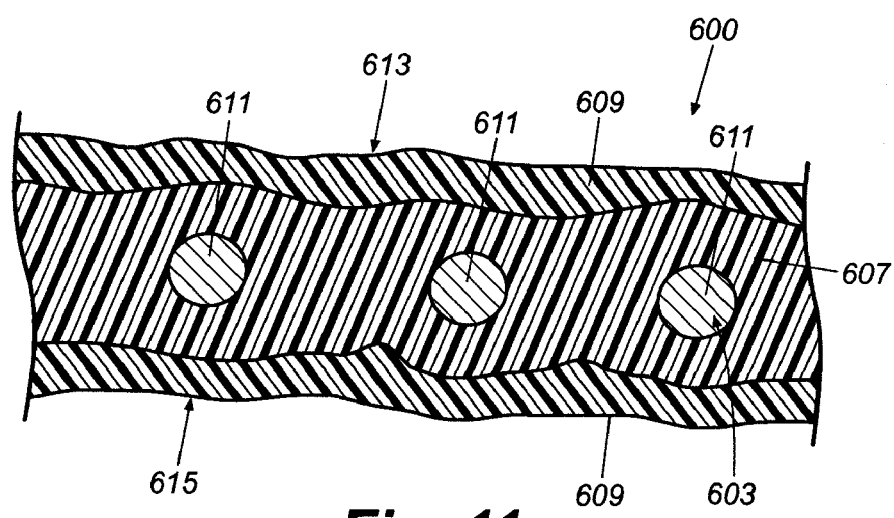
FIG. 11 is a schematic representation of a cross-section of a segment of yet another exemplary gasket according to various aspects of the invention.

FIG. 11 is a cross-sectional segment of yet another exemplary gasket 600 according to various other aspects of the invention. The gasket 600 is similar to the first embodiment in that it includes a pervious base sheet 603 in the form of a mesh screen. The gasket comprises a primary sealing material 607 filling the interstitial spaces between the elements 611 of the base sheet 603 and a secondary sealing material 609 covering the primary sealing material and forming the upper face 613 and lower face 615 of the gasket. In the embodiment of FIG. 11, the primary sealing material 607 provides structural strength to the gasket 600 and provides the bulk sealing properties of the gasket by providing resistance to fluid flow through the base sheet 603. The secondary sealing material 609 contacts the sealing surfaces and generally forms a fluid tight interface between the upper and lower faces 613, 615 and the sealing surfaces to prevent leakage of fluid between the sealing surface and the respective face of the gasket. In this way, the primary sealing material 129 enhances the bulk sealing properties of the gasket 100 and the secondary sealing material enhances the interfacial sealing properties of the gasket.

Figure 11A:
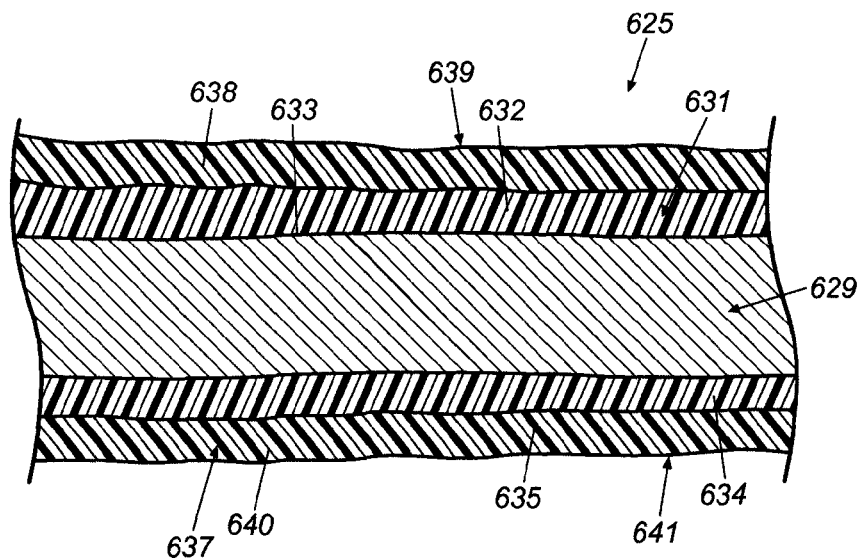
FIG. 11A is a schematic representation of a cross-section of a segment of yet another exemplary gasket according to various aspects of the invention.

FIG. 11A is a cross-sectional segment of yet another exemplary gasket 625 according to various other aspects of the invention. The gasket 625 is similar to the previous embodiment except the base sheet 629 is substantially planar and continuous rather than a mesh screen with interstitial spaces. The primary sealing material 631 includes a top polymeric material layer 632 adhered to the top surface 633 of the base sheet 629 and a bottom polymeric material layer 634 adhered to the bottom surface 635 of the base sheet. In the embodiment of FIG. 11A, the secondary sealing material 637 includes a top polymeric material layer 638 adhered to the top layer 632 of the primary sealing material 633 so as to form the upper face 639 of the gasket 625 and a bottom polymeric material layer 640 adhered to the bottom layer 634 of the primary sealing material forming a lower face 641 of the gasket. In the illustrated embodiments the primary sealing material 631 covers substantially all the top and bottom surfaces 633, 635 of the base sheet and the secondary sealing material 637 covers substantially all of the top and bottom layers 632, 634 of primary sealing material. The primary sealing material 631 and/or secondary sealing material 637 may be selectively applied to less than the entire surface area of the base sheet without departing from the invention.

Figure 12:
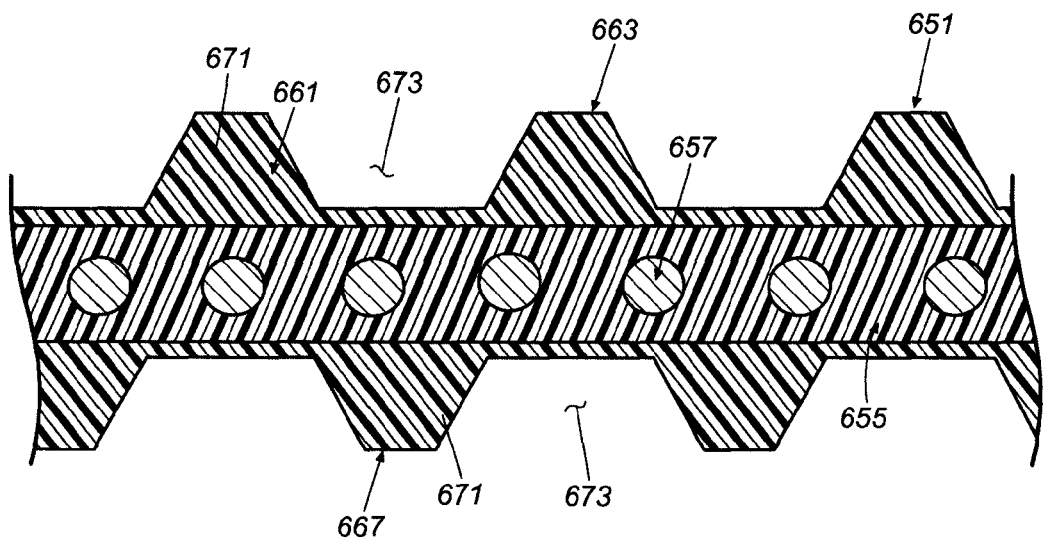
FIG. 12 is a schematic representation of a cross-section of a segment of yet another exemplary gasket according to various aspects of the invention.

FIG. 12 is a cross-sectional segment of yet another exemplary gasket 651 according to various other aspects of the invention. As shown in FIG. 12, the gasket 651 includes a primary sealing material 655 adhered to the base sheet 657 and a secondary sealing material 661 covering the top and bottom of the primary sealing material. In the illustrated embodiment, the secondary sealing material 661 is formed into a patterned surface on the upper face 663 of the gasket 651 and a patterned surface on the lower face 667 of the gasket. The patterned surfaces are generally similar to the patterned surfaces described above for the embodiments of FIGS. 9, 9A and 10. The patterned surfaces include projections 671 and recesses 673 in the upper and lower faces 663, 667. The patterned surfaces of the upper and lower faces 663, 667 may be formed in any suitable manner such as press-forming of the secondary sealing material after application to the primary sealing material. Also, the patterned surfaces of the secondary sealing material may be formed by direct application of the secondary sealing material 661 by various methods (e.g., spray coating, printing, etc) that eliminate the need for press-forming or other forming steps after application of the secondary sealing material.

Figure 13:
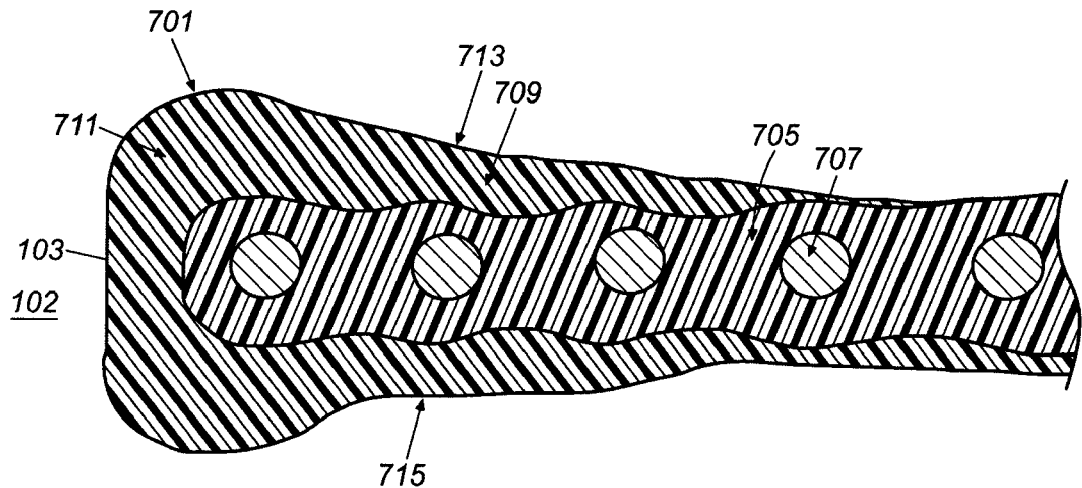
FIG. 13 is a schematic representation of a cross-section of a segment of yet another exemplary gasket according to various aspects of the invention.

FIG. 13 is a cross-sectional segment of yet another exemplary gasket 701 according to various other aspects of the invention. The segment of the gasket 701 illustrated in FIG. 13 includes an edge margin of the gasket generally adjacent the edge 103 forming the opening 102 of the gasket. The gasket includes a primary sealing material 705 adhered to a base sheet 707, and a secondary sealing material 709 adhered to the primary sealing material. In the embodiment of FIG. 13, the secondary sealing material 709 is formed into an edge sealing projection 711 that projects above the base sheet 707 and primary sealing material 705 at the upper face 713 of the gasket. In the illustrated embodiment, the edge sealing projection 711 projects below the base sheet 707 and primary sealing material 705 at the lower face 717 of the gasket. In the embodiment of FIG. 13, the edge sealing projection 711 comprises the inner edge 103 forming the opening 102 of the gasket, but the edge sealing projection could be otherwise located such as being spaced inward from the edge of the gasket so that the primary sealing material 705 or base sheet 707 forms the inner edge of the gasket. Further, the edge sealing projection 711 could comprise a separate upper projection and a separate lower projection adjacent the edge 103 of the gasket 701 or the separate projections would be spaced inward from the edge of the gasket without departing from this invention.

The edge sealing projection 711 concentrates the compression load at the edge margin of the gasket 701 so as to reduce the total amount of secondary sealing material 709 that is needed to provide a fluid-tight interface between the gasket and the two sealing surfaces.

The edge sealing projection 711 may be applied to the primary sealing material 705 in a variety of methods including screen printing the secondary sealing material onto the base sheet 707 that has been previously coated with primary sealing material, injection molding the edge sealing member onto the base sheet coated with primary sealing material, spraying the secondary sealing material onto the base sheet coated with primary sealing material, or any other suitable application method.

Figure 14:
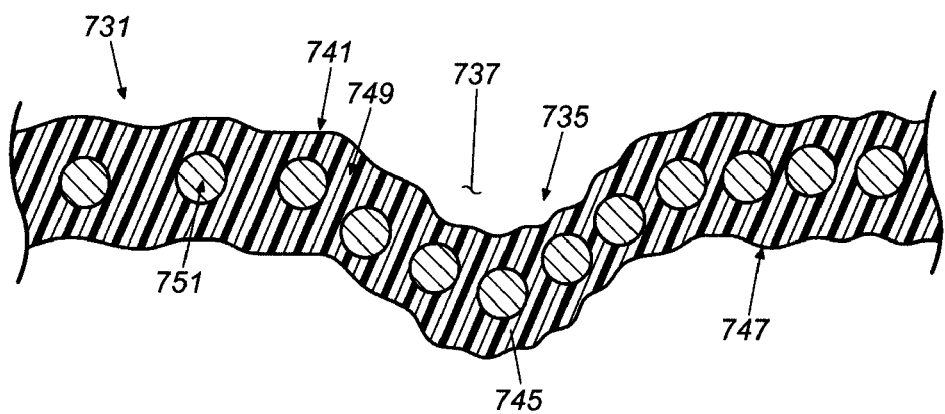
FIG. 14 is a schematic representation of a cross-section of a segment of yet another exemplary gasket according to various aspects of the invention.

FIG. 14 depicts a schematic of a cross-sectional segment of yet another exemplary gasket 731 according to various other aspects of the invention. This embodiment is similar to the embodiment of FIGS. 1 and 2 except that the gasket has an embossment 735 comprising an indentation 737 on the upper face 741 of the gasket and a projection 745 on the lower face 747 of the gasket. The embossment 735 concentrates the compression load applied to the gasket 731 and allows the gasket to seal against the two sealing surfaces at a lower applied load with a reduced amount of permeating or primary sealing material 749 surrounding the base sheet 751. In the illustrated embodiment the indentation 737 is on the upper face and the projection 745 is on the lower face but the gasket 731 could be otherwise configured with the indentation on the lower face and the projection on the upper face. The embossment 735 can extend across a length of the gasket 731 and have a shape that generally conforms to the edge 103 forming the opening 102, or the embossment may be otherwise shaped and arranged without departing from the invention.

Figure 15:
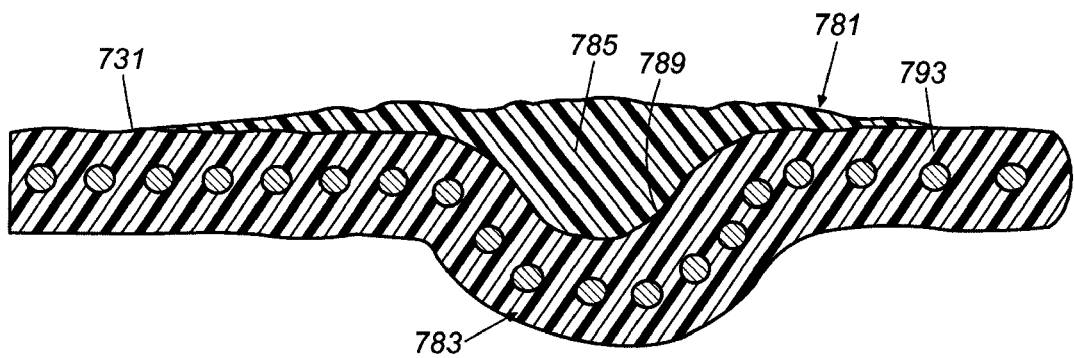
FIG. 15 is a schematic representation of a cross-section of a segment of yet another exemplary gasket according to various aspects of the invention.

FIG. 15 depicts a schematic of a cross-sectional segment of yet another exemplary gasket 781 according to various other aspects of the invention. This embodiment is similar to the previous embodiment in that the gasket 781 has an embossment 783. As shown in FIG. 15, the embossment 783 includes secondary sealing material 785 that fills the indentation 789 of the embossment. In the illustrated embodiment, the secondary sealing material 785 partially covers the top surface 791 of the primary sealing material 793 covering the base sheet 795. In other embodiments, the secondary sealing material covers substantially all of the top surface 791 of the primary sealing material 793 and includes a portion of increased thickness to substantially fill the indentation. The secondary sealing material 785 in the indentation 789 provides increased structural strength to the gasket 781 and prevents the embossment 783 from collapsing upon compression of the gasket between the two sealing surfaces.

It will be understood that with this exemplary construction and others contemplated hereby, the base sheet, permeating material, and/or primary and secondary sealing materials may be selected to provide a particular minimum gap or, conversely, a maximum compression between flanges. In doing so, the need for rigid spacers or other devices commonly used to maintain a gap between the flange surfaces may be eliminated. By way of example, and not by limitation, consider a metal or other semi-rigid mesh used as the pervious base sheet. Where the wires or strands of the mesh intersect, there is a total base sheet thickness approximately equal to the sum of the two strand diameters that restricts the ability of a flange to approach an opposed flange pressed against the opposite surface of the gasket. Thus, by selecting the base sheet to have a particular wire or strand diameter, the minimum gap between the flange surfaces can be controlled. Additionally, it is understood that many permeating materials and/or primary and secondary sealing materials, for example, polymers, are susceptible to stress relaxation, thereby resulting in extrusion from the flange area. By providing a minimum gap and, therefore, maximum compression, the polymer may be subject to less compressive force and, therefore, less extrusion under pressure. Alternatively, where it is desired to use a particular polymer, the base sheet can be selected to minimize stress relaxation and, therefore, extrusion under pressure. It will be understood that since the pervious base sheet and the permeating and/or primary and secondary sealing materials material work in concert, numerous combinations thereof may be selected to provide the desired properties of the resulting gasket.

Although certain embodiments of this invention have been described above with a certain degree of particularity, those skilled in the art could make numerous alterations to the disclosed embodiments without departing from the spirit or scope of this invention. Any directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

While the present invention is described herein in detail in relation to specific aspects, it is to be understood that this detailed description is only illustrative and exemplary of the present invention and is made merely for purposes of providing a full and enabling disclosure of the present invention. It will be recognized by those skilled in the art, that various elements discussed with reference to the various embodiments may be interchanged to create entirely new embodiments coming within the scope of the present invention. It is intended that all matter contained in the above description or shown in the accompanying drawings shall be interpreted as illustrative only and not limiting. Changes in detail or structure may be made without departing from the spirit of the invention. The detailed description set forth herein is not intended nor is to be construed to limit the present invention or otherwise to exclude any such other embodiments, adaptations, variations, modifications, and equivalent arrangements of the present invention.

The foregoing description of the invention illustrates and describes various embodiments of the present invention. As various changes could be made in the above construction without departing from the scope of the invention, it is intended that all matter contained in the above description or shown in the accompanying drawings shall be interpreted as illustrative and not in a limiting sense. Furthermore, the scope of the present invention covers various modifications, combinations, alterations, etc., of the above-described embodiments that are within the scope of the claims. Additionally, the disclosure shows and describes only selected embodiments of the invention, but the invention is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the invention without departing from the scope of the invention.

What is claimed is:

1. A gasket having an upper face and a lower face, the gasket comprising:
    a base sheet, the base sheet having an upper surface and a lower surface and comprising a pervious material having interstitial spaces therein, the base sheet comprising a mesh material having parallel first elements and transversely extending second elements intersecting the first elements, the interstitial spaces being respectively between the intersecting first and second elements; and
    a permeating material at least partially covering the upper and lower surfaces of the base sheet and at least partially filling the interstitial spaces, the permeating material comprising a polymer material and having an upper patterned surface on the upper face of the gasket and a lower patterned surface on the lower face of the gasket, the upper and lower patterned surfaces each comprising intersecting projections and recesses respectively between the intersecting projections, wherein the upper surface and lower surface are partially free from coverage with the permeating material at locations corresponding to the upper and lower recesses.

2. The gasket of claim 1 wherein the upper and lower patterned surfaces comprise substantially all of the surface area of the respective upper face and lower face.

3. The gasket of claim 2 wherein the intersecting projections and recesses comprise a grid pattern on each of the upper face and the lower face.

4. The gasket of claim 1 wherein the intersecting projections on the upper face project away from an upper surface of the first and second elements and the intersecting projections on the lower face project away from a lower surface on the first and second elements.

5. The gasket of claim 1 wherein the permeating material comprises polyacrylate rubber (ACM).

6. The gasket of claim 1 wherein the permeating material comprises fluoroelastomer.

7. A method of forming a gasket having an upper face and a lower face, the method comprising:
    providing a base sheet having an upper surface, a lower surface and interstitial spaces, the base sheet comprising a mesh material having parallel first elements and transversely extending second elements intersecting the first elements, the interstitial spaces being respectively between the intersecting first and second elements;
    at least partially covering the base sheet with a permeating material and at least partially filling the interstitial spaces,
    forming an upper patterned surface on the upper surface of the base sheet; and
    forming a lower patterned surface on the lower surface of the base sheet, the upper and lower patterned surfaces each comprising intersecting projections and recesses respectively between the intersecting projections, wherein the upper surface and lower surface are partially free from coverage with the permeating material at locations corresponding to the upper and lower recesses.

8. The method of claim 7 wherein the upper and lower patterned surfaces are formed on substantially all of the surface area of the respective upper face and lower face.

9. The method of claim 7 wherein the intersecting projections and recesses comprises a grid pattern formed on each of the upper face and the lower face.

10. The method of claim 7 wherein covering the base sheet comprises dipping the base sheet in a polymeric coating.

11. The method of claim 7 wherein covering the base sheet comprises spraying the base sheet with a polymeric coating.

12. A gasket comprising:
- a base sheet having an upper surface and a lower surface, formed of a mesh material having parallel first elements, transversely extending second elements intersecting the first elements, and the interstitial spaces being respectively between the intersecting first and second elements;
- a coating of polymeric material on the upper surface and lower surface of the base sheet at least partially filling the interstitial spaces, the coating being configured in a pattern defined by raised portions forming an upper patterned surface of the upper surface of the gasket and lowered portions forming a lower patterned surface of the lower surface of the gasket, the raised portions comprising intersecting projections forming recesses between the respective raised portions, the lowered portions comprising intersecting projections forming recesses between the respective lowered portions, wherein the upper surface and lower surface are partially free from coverage with the permeating material at locations corresponding to the upper and lower recesses.

13. The gasket of claim 12 wherein the mesh material comprises a screen.

14. The gasket of claim 13 wherein the screen is formed of intersecting metal strands.

15. The gasket of claim 12 wherein the base sheet has first and second faces and the coating is configured in a pattern on at least one of the faces.

16. The gasket of claim 12 wherein the raised portions and lowered portions extend across substantially all of the surface area of the gasket.

17. The gasket of claim 12 comprising:
- a wire mesh base sheet having first and second faces;
- a coating of polymeric material on the base sheet, the coating being formed into a predetermined pattern on at least one face of the base sheet.

18. The gasket of claim 17 wherein the predetermined pattern extends across substantially all of the surface area of the at least one face.

\* \* \* \* \*